(12) United States Patent
Chen et al.

(10) Patent No.: US 11,492,297 B2
(45) Date of Patent: Nov. 8, 2022

(54) CEMENT-BASED CEMENTITIOUS MATERIAL AND ITS FORMATION METHOD

(71) Applicant: NATIONAL TAIWAN UNIVERSITY OF SCIENCE AND TECHNOLOGY, Taipei (TW)

(72) Inventors: Chun-Tao Chen, Taipei (TW); Yue-Sheng Wang, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 280 days.

(21) Appl. No.: 16/580,710

(22) Filed: Sep. 24, 2019

(65) Prior Publication Data

US 2020/0377423 A1 Dec. 3, 2020

(30) Foreign Application Priority Data

Jun. 3, 2019 (TW) .................................. 108119099

(51) Int. Cl.
*C04B 40/00* (2006.01)
*C04B 14/14* (2006.01)
(Continued)

(52) U.S. Cl.
CPC ........ *C04B 40/0007* (2013.01); *B28B 11/242* (2013.01); *B28B 11/246* (2013.01);
(Continued)

(58) Field of Classification Search
CPC ............ C04B 40/0003; C04B 40/0007; C04B 40/0286; C04B 14/14; C04B 22/064;
(Continued)

(56) References Cited

U.S. PATENT DOCUMENTS 2,841,856 A * 7/1958 Gelbman ................ B28C 5/466
264/426
5,637,412 A * 6/1997 Jennings ................... B28B 1/00
106/606

(Continued)

FOREIGN PATENT DOCUMENTS

CN 1415825 A * 5/2003
CN 108677640 A 10/2018

OTHER PUBLICATIONS

Machine English translation of CN1415825A; Wang (2003), retrieved from https://worldwide.espacenet.com/patent/search/family/004750712/publication/CN1415825A?q=pn%3DCN1415825A (Year: 2003).*

(Continued)

*Primary Examiner* — Francisco W Tschen
*Assistant Examiner* — Edgaredmanuel Troche
(74) *Attorney, Agent, or Firm* — Birch, Stewart, Kolasch & Birch, LLP (57) ABSTRACT

A method for forming cement-based cementitious material includes: pouring a cement paste into a mold; applying an electrical current to the cement paste to perform an electro-osmotic reaction; and transferring the reacted cement paste into a water tank for curing, thereby obtaining a functionally graded cement-based cementitious material. A pair of electrodes is placed in the mold and connected to an external power source. The compressive strength of the functionally graded cement-based cementitious material in the middle is lower than that at either of both ends.

18 Claims, 6 Drawing Sheets

(51) Int. Cl.
  C04B 22/06  (2006.01)
  C04B 28/24  (2006.01)
  C04B 40/02  (2006.01)
  C04B 20/00  (2006.01)
  B28B 11/24  (2006.01)

(52) U.S. Cl.
  CPC ............ *C04B 14/14* (2013.01); *C04B 22/064* (2013.01); *C04B 28/24* (2013.01); *C04B 40/0286* (2013.01); *C04B 20/0076* (2013.01); *C04B 2201/20* (2013.01); *C04B 2201/50* (2013.01)

(58) Field of Classification Search
  CPC . C04B 28/24; C04B 20/0076; C04B 2201/20; C04B 2201/50; B28B 11/246; B28B 11/242
  USPC ........................................................ 264/426
  See application file for complete search history.

(56) References Cited

U.S. PATENT DOCUMENTS

| | | | | |
|---|---|---|---|---|
| 6,919,005 | B2* | 7/2005 | McInerney | B01D 61/56 |
| | | | | 204/515 |
| 10,640,425 | B2* | 5/2020 | Ciuperca | B28B 11/246 |
| 2020/0392022 | A1* | 12/2020 | Mykytiuk | C02F 1/34 |

OTHER PUBLICATIONS

Z. Xue et al., "Mechanism of electro-osmotic chemical for clay improvement: Process analysis and clay property evolution", Oct. 2015, Applied Clay Science, vol. 166, Sep. 12, 2018, pp. 18-26 (Year: 2018).*

Ce Bian et al., "Influence of electro-osmosis applied to concrete demoulding on its properties," Indian Journal of Engineering & Materials Sciences, vol. 22, Oct. 2015, pp. 559-569 (Year: 2015).*

Taiwanese Office Action for Appl. No. 108119099 dated Feb. 24, 2020.

* cited by examiner

CEMENT-BASED CEMENTITIOUS MATERIAL AND ITS FORMATION METHOD

CROSS-REFERENCE TO RELATED APPLICATIONS

The present application claims priority of Taiwan Application No. 108119099, filed on Jun. 3, 2019, which is incorporated by reference herein in its entirety.

BACKGROUND

Technical Field

The disclosure relates to a cement-based cementitious material and more particularly to a functionally graded cement-based cementitious material and its formation method.

Description of the Related Art

In modern life, with the growth of the population, the number of the building has gradually increased. Also, the building regulations and requirements on interior decoration and partition are changing with the times, and thus the traditional building materials are unlikely to meet the current multi-functional needs. In the prior art, in addition to the traditional bricks or wood partitions, lightweight bricks are used as partition materials more often nowadays, thereby achieving specific properties, such as fire resistance, acoustic insulation, heat insulation, etc. However, the prior art still fails to fully meet current demands for the building materials at a time.

Most lightweight bricks have only a single property, such as acoustic insulation and heat insulation, and their compressive strength is not high enough, so most of them cannot be used in the main load-bearing walls. In addition, a high-temperature and high-pressure environment may be required for the process of making such lightweight bricks, or an admixture may be required so that the cost can be high. Therefore, producing building bricks having acoustic insulation and heat insulation properties as well as strength and low cost is an important issue.

SUMMARY

In one embodiment of the present disclosure, a method for forming cement-based cementitious material is provided, wherein the method includes: pouring a cement paste into a mold, wherein a pair of electrodes is disposed in the mold, and the pair of electrodes is connected to an external power source; applying an electrical current to the cement paste to perform an electro-osmotic reaction; and transferring the reacted cement paste into a water tank for curing, thereby obtaining a functionally graded cement-based cementitious material.

In one embodiment of the present disclosure, a functionally graded cement-based cementitious material is provided, wherein a compressive strength in a middle of the cement-based cementitious material is lower than that at either of both ends.

The above-described objects, features, and advantages of the invention will be apparent from the several embodiments, figures, and description, the details of which are provided below.

BRIEF DESCRIPTION OF THE DRAWINGS

Aspects of this disclosure are best understood from the following detailed description when read with the accompanying figures. It should be noted that, in accordance with common practice in the industry, various features are not drawn to scale.

In fact, the dimensions of the various features may be arbitrarily increased or reduced for clarity of discussion.

DETAILED DESCRIPTION

The following disclosure provides many different embodiments, or examples, for implementing different features of the subject matter provided. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features. In addition, the present disclosure may repeat reference numerals and/or letters in the various examples. This repetition is for simplicity and clarity and does not in itself dictate a relationship between the various embodiments and/or configurations discussed.

Furthermore, spatially relative terms, such as "over," "below," "lower," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented, and the spatially relative descriptors used herein may likewise be interpreted accordingly.

The terms "about," "approximately," and "substantially" used herein generally refer to the value of an error or a range within 20 percent, preferably within 10 percent, and more preferably within 5 percent, within 3 percent, within 2 percent, within 1 percent, or within 0.5 percent. If there is no specific description, the values mentioned are to be regarded as an approximation that is an error or range expressed as "about," "approximate," or "substantially."

Although some embodiments are discussed with steps performed in a particular order, these steps may be performed in another logical order. Some of the features described below can be replaced or eliminated for different embodiments. It is understandable that additional operations may be performed before, during, or after the method described, and that in other embodiments of the method, some of the operations may be substituted or omitted.

Embodiments of the present disclosure provide a functionally graded cement-based cementitious material, in which the hydration path is modified by the electro-osmotic reaction. The compressive strength of the cement paste is partially increased within short hydration time, thus forming a graded cement-based cementitious material having sufficient strength as well as acoustic insulation and heat insulation properties.

In detail, the present disclosure provides a method for forming a cement-based cementitious material, which contains pouring a cement paste into a mold; applying an electrical current to the cement paste to perform an electro-osmotic reaction; and transferring the reacted cement paste into a water tank for curing, thereby obtaining a functionally graded cement-based cementitious material. A pair of electrodes is disposed in the mold, and the pair of electrodes is connected to an external power source.

In the present disclosure, cement and water may be used for making cement paste.

Portland Types I-V cements, which comply with ASTM (American Society for Testing Materials) C150, and water may be used for making cement paste. In some embodiments, Portland Type I cement, which complies with ASTM C150, and water are used for making cement paste.

Cement undergoes hydration when it contacts water, and the reaction formulas are shown below:

$$2(2CaO.SiO_2)+4H_2O \rightarrow 3CaO.2SiO_2.3H_2O+Ca(OH)_2$$

$$2(3CaO.SiO_2)+6H_2O \rightarrow 3CaO.2SiO_2.3H_2O+3Ca(OH)_2$$

The hydration is mainly carried out by the reactions between the tricalcium silicate ($C_3S$) and dicalcium silicate ($C_2S$) in the cement and water to form cementitious materials, such as calcium hydroxide ($Ca(OH)_2$) and C—S—H gel ($CaO.SiO_2.3H_2O$), which fills pores in the cement paste, thereby obtaining a hardened cement-based cementitious material. However, in general, the compressive strength 210 kgf/cm$^2$ (3000 psi) can be regarded as a benchmark of structural concrete.

In some embodiments, in addition to the cement paste per se, additional aggregates may be added to reduce the amount of the cement, thereby improving volume stability and increasing the compressive strength of the cement-based cementitious materials. The aggregates are classified into fine and coarse by standard sieve sizes according to ASTM. The fine aggregates have sizes between the standard sieve No. 200 (150 μm) and standard sieve No. 4 (4.75 mm), and the coarse aggregates have sizes larger than 4.75 mm. In the cement paste with added coarse and fine aggregates (also referred to as concrete), the pozzolanic materials may be additionally added, such as fly ash, slag, silica fume, or the like.

Additional lightweight aggregates may be added, which are materials having an average unit weight less than 1440 kg/m$^3$ (90 lb/ft$^3$) after 28-day oven drying, thereby reducing the weight of cement-based cementitious materials, and having properties such as heat insulation, acoustic insulation, and fire resistance.

As the specimen in the embodiment of the present disclosure, the cement paste may include not only cement and water but also aggregates and pozzolanic materials, and the like. For example, the cement paste may be a mixture of cement, water, and the fine aggregates (also referred to as cement mortar), a mixture of cement, water, and fine and coarse aggregates (also referred to as concrete), or a mixture of cement, water, fine and coarse aggregates, pozzolanic materials (also referred to as a concrete) or the like.

It can be understood from the above reaction formula that a certain amount of water is required during the hydration. In general, the water-to-cement ratio can be used as the basis for judging the strength development. The water-to-cement ratio refers to the weight ratio of water to cement, mostly expressed as W/C. In an embodiment, the water-to-cement ratio is about between 0.6 and 0.8. If there is not enough water, the hydration is not likely sufficient, and thus the compressive strength is not high enough. Also, because the resistivity of the cement paste itself is large, the electro-osmotic effect is not obvious. If there is too much water, bleeding or aggregate segregation is likely to occur, inducing cracks and porosities, and the like in the cement-based cementitious material. In another embodiment, the water-to-cement ratio of the cement paste is about 0.6.

By referring to American Concrete Institute (ACI), a person having ordinary skill in the art can do the mix design calculation to select the amount of cement, water, aggregates, and pozzolanic materials.

Figure 1:
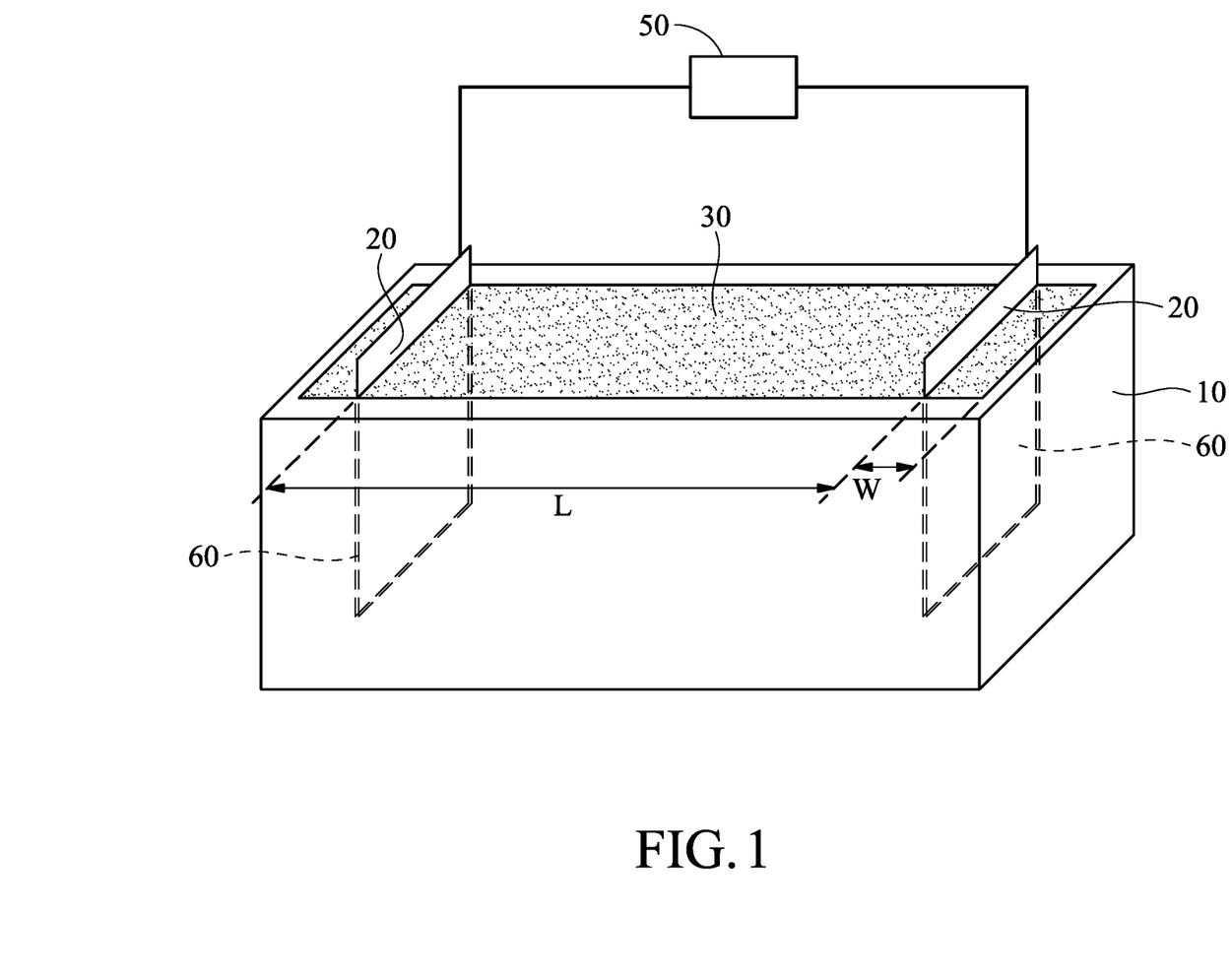
FIG. 1 is a perspective view of the mold in accordance with an embodiment of the present invention.

Next, in the step of pouring the cement paste into the mold, the cement paste (also referred to as the specimen) prepared by the mix design is poured into the mold, as shown in FIG. 1.

FIG. 1 is a perspective view of the mold. The material of the mold may be acrylic. The electrodes 20 may be coated with non-woven fabric 60 and then immersed in the cement paste 30. The electrodes 20 are connected to the external power source 50. The purpose of using a non-woven fabric is to facilitate the removal of the reusable electrode from the mold after the cement paste is hardened. The electrodes 20 may be meshes, plates, bars, or the like. The shapes are not particularly limited, providing that the electrical current can pass the specimens uniformly. In addition, the electrodes 20 may be conductive materials, such as metals, non-metals, metal alloys, or the like. Exemplary metals may be titanium (Ti), platinum (Pt), other metals, or metal alloys thereof, or the like, providing that it is not easy to rust (or corrosion resistant). Exemplary non-metals may be graphite, graphene, or the like. In an embodiment, titanium meshes are used as the electrodes.

Referring to FIG. 1, in the mold, the length of the specimen (cement paste) 30 is L. The length of the specimen 30 is about between 200 and 500 mm. The total length of the inner side of the mold 10 may change according to the desired length of the specimen 30. The distance between electrodes 20 and the inner side of the mold is W, which is about 12.5 mm. When the length of the specimen 30 is larger than 500 mm, the distance of the ion movement becomes long, causing a reduced electro-osmotic effect (that is, functionally graded effect). When the length of the specimen 30 is less than 200 mm, although the electro-osmotic effect is obvious, the thickness of the formed cement-based cementitious material is small, and thus properties such as acoustic insulation or heat insulation are not obvious in practice.

After the cement paste is poured into the mold, the electrical current may be applied immediately to perform the electro-osmotic reaction. Alternatively, the cement paste may be allowed to rest for 1 minute or more before the electrical current is applied to perform the electro-osmotic reaction. However, it is preferable to perform the electro-osmotic reaction before the hydration sufficient for the strength (i.e., final setting) to obtain a better effect. In an embodiment, after cement paste is poured into the mold, the electrical current is applied immediately to perform the electro-osmotic reaction.

The electro-osmotic reaction performed by the applied electrical current causes calcium ions ($Ca^{2+}$) and hydroxide ions ($OH^-$) in water migrate to the vicinity of the electrodes, respectively, and then the calcium hydroxide ($Ca(OH)_2$) is formed at the electrodes and filled the pores in the cement paste, thereby increasing the compressive strength of the cement-based cementitious material.

In the step of applying the electrical current to the cement paste to perform the electro-osmotic reaction, an electrical current between 0.01 and 0.2 A may achieve the effect of increasing compressive strength. As overly high electrical current forces excessive ions to move, adversely affecting early hydration behavior and reducing the formation of calcium hydroxide ($Ca(OH)_2$) and C—S—H gel, and thus it is not likely to increase compressive strength significantly. On the other hand, it is difficult to move ions to the electrodes by an overly low electrical current, and thus it is not likely to form the functionally graded cement-based cementitious material. In an embodiment, the electrical current is about 0.05 A.

In the step of applying the electrical current to the cement paste to perform the electro-osmotic reaction, the electrical current is applied for 2 to 14 hours to obtain the effect of increasing compressive strength. If the electrical current is applied for too long, due to the movement of excessive ions, the hydration is incomplete. Also, because cementitious materials are formed gradually by the hydration of the cement, it is not likely for the ions to move smoothly and thus it is not likely to produce an obvious change in the compressive strength. If the electrical current is applied for too short, the functional grading of the cement-based cementitious material may not be obvious. In an embodiment, the electrical current is applied for about 8 hours.

After the electro-osmotic reaction is complete, the cement paste is then transferred into the water tank for curing for about 3 to 28 days. The curing can continue the hydration, which fills the pores in the reacted cement paste and increases the compressive strength of the cement-based cementitious material. In an embodiment, the most obvious electro-osmotic effect may be obtained by curing for about 7 days. In an embodiment, the curing may also be performed in a tank containing saturated lime water. In addition, in an embodiment, a curing tank with high temperature and pressure may be used to increase compressive strength in a shorter time.

Figure 2:
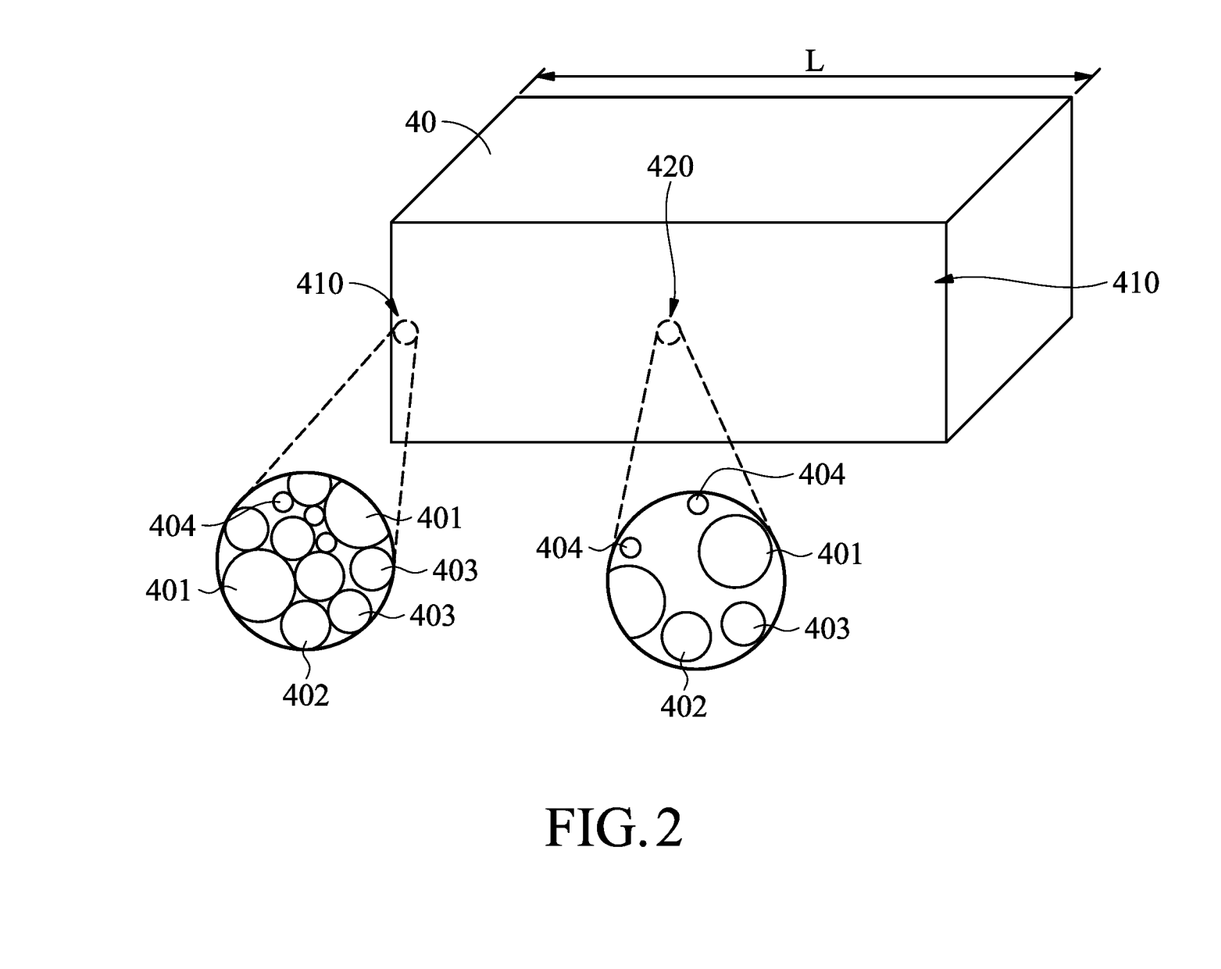
FIG. 2 is a perspective view of the functionally graded cement-based cementitious material in accordance with an embodiment of the present invention.

After curing, a functionally graded cement-based cementitious material may be obtained. In FIG. 2, it may be seen that the porosity at either of both ends 410 of the cement-based cementitious material 40 is less than that in the middle 420. In the enlarged view at both ends 410, it may be seen that the aggregates 401, the unhydrated cement 402, the calcium hydroxide ($Ca(OH)_2$) 403, and the C—S—H gel 404 are closely stacked, causing low porosity and high compactness. On the other hand, in the enlarged view in the middle 420, it may be seen that the aggregates 401, the unhydrated cement 402, the calcium hydroxide ($Ca(OH)_2$) 403, and the C—S—H gel 404 are loosely stacked, causing high porosity and low compactness. It may be inferred that the high compactness at both ends is caused by the reduction of the unhydrated cement 402 and the increase of the C—S—H gel 404.

As stated above, the porosity is related to the compressive strength. Since the porosity at either of both ends 410 is less than that in the middle 420, the compressive strength at either of both ends 410 of the cement-based cementitious material is higher than that in the middle, and thus the cement-based cementitious material is functionally graded.

As stated above, the length of the resulting cement-based cementitious material is about between 200 and 500 mm. In addition, the cement paste into which the aggregates or the pozzolanic materials are added may also be used to form the functionally graded cement-based cementitious material through the electro-osmotic reaction. By experimental analyses, it is determined that the compressive strength of the entire functionally graded cement-based cementitious material is higher than 210 $kgf/cm^2$, and the amorphous ratio of the cement-based cementitious material at either of both ends is higher than that in the middle. When cement paste is used as the specimen, the ratio of the calcium hydroxide ($Ca(OH)_2$) to the tricalcium silicate ($3CaO.SiO_2$), and the dicalcium silicate ($2CaO.SiO_2$) of the cement-based cementitious material at either of both ends is higher than that in the middle. When cement mortar is used as the specimen, the ratio of the calcium hydroxide ($Ca(OH)_2$) to the silica ($SiO_2$) of the cement-based cementitious material at either of both ends is higher than that in the middle. The high amorphous C—S—H gel and calcium hydroxide ($Ca(OH)_2$) suggests the high degree of hydration at either of both ends.

The following experimental data show the results of compressive strength test and X-ray diffraction analyses of the cement-based cementitious material.

Figure 3:
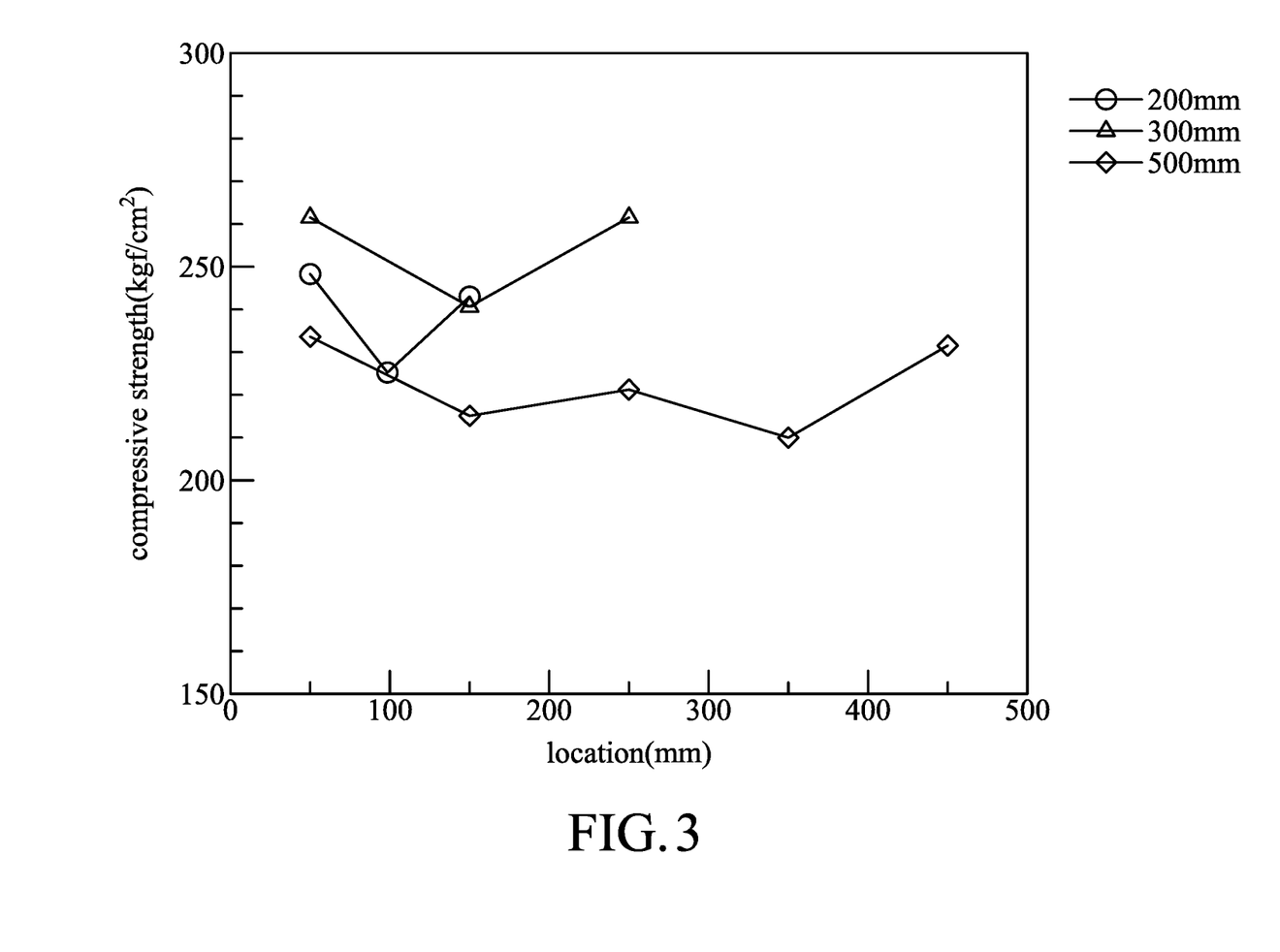
FIG. 3 is a plot of compressive strength versus location for specimens with different lengths in accordance with an embodiment of the present invention.

FIG. 3 is a plot of the compressive strength versus location for specimens with different lengths. The cement mortar, which contained Portland Type I cement complying with ASTM C150, water, and fine aggregates (including the sands), was used as the specimen, poured into the mold, and subjected to an electrical current of 0.05 A for 8 hours to form a cement-based cementitious material. The compressive strength test shows that, whether the length L of the cement-based cementitious material after the electro-osmotic reaction is 200 mm, 300 mm, or 500 mm, the functional grade is achieved. That is, the compressive strength at either of both ends is higher than that in the middle (the experimental point in the middle when the length L is 500 mm can be regarded as an experimental error). It should be noted that all of the compressive strength is higher than 210 $kgf/cm^2$, which meets the minimum requirement for the structural concrete.

The above result is surprising and unexpected since it was presumed that the compressive strength of the cement-based cementitious material is increased only at one end. According to the literature, in soil subjected to the electro-osmosis, the water in the pores may move from the anode to the cathode due to the electrical current. Assuming that the above phenomenon also occurs in the cement paste, a change in the water-to-cement ratio along the direction of the electrical current should happen, further inducing a change in strength. However, it is surprisingly found in the experimental results that the compressive strength at both ends increases, an unexpected effect for those having ordinary skill in the art.

Figure 4:
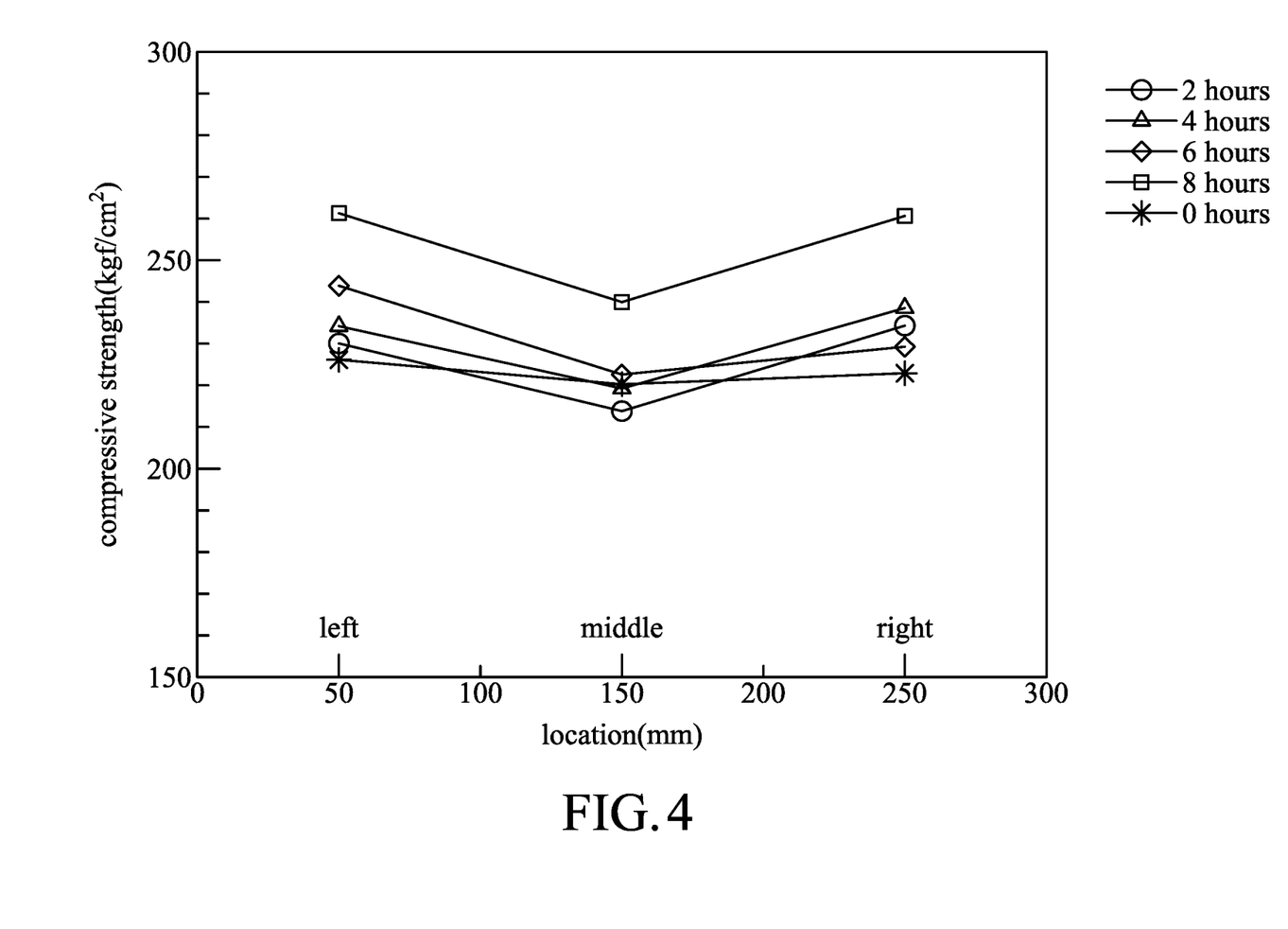
FIG. 4 is a plot of compressive strength versus location for specimens with different periods of electrical charging in accordance with an embodiment of the present invention.

FIG. 4 is a plot of the compressive strength versus location for specimens with different periods of electrical charging. The cement mortar was used as the specimen, poured into the mold, and subjected to an electrical current of 0.05 A to form a cement-based cementitious material with a length of 300 mm. The compressive strength test shows that, whether the period of the current applied on the cement-based cementitious material after the electro-osmotic reaction is 2 hours, 4 hours, 6 hours, or 8 hours, the functional grade is achieved. That is, the compressive strength at either of both ends is higher than that in the middle. It should be noted that all of the compressive strength is higher than 210 $kgf/cm^2$, which meets the minimum requirement for the structural concrete. As can be seen, the functionally graded cement-based cementitious material may be obtained by applying the electrical current for about between 2 hours and 14 hours.

Figure 5:
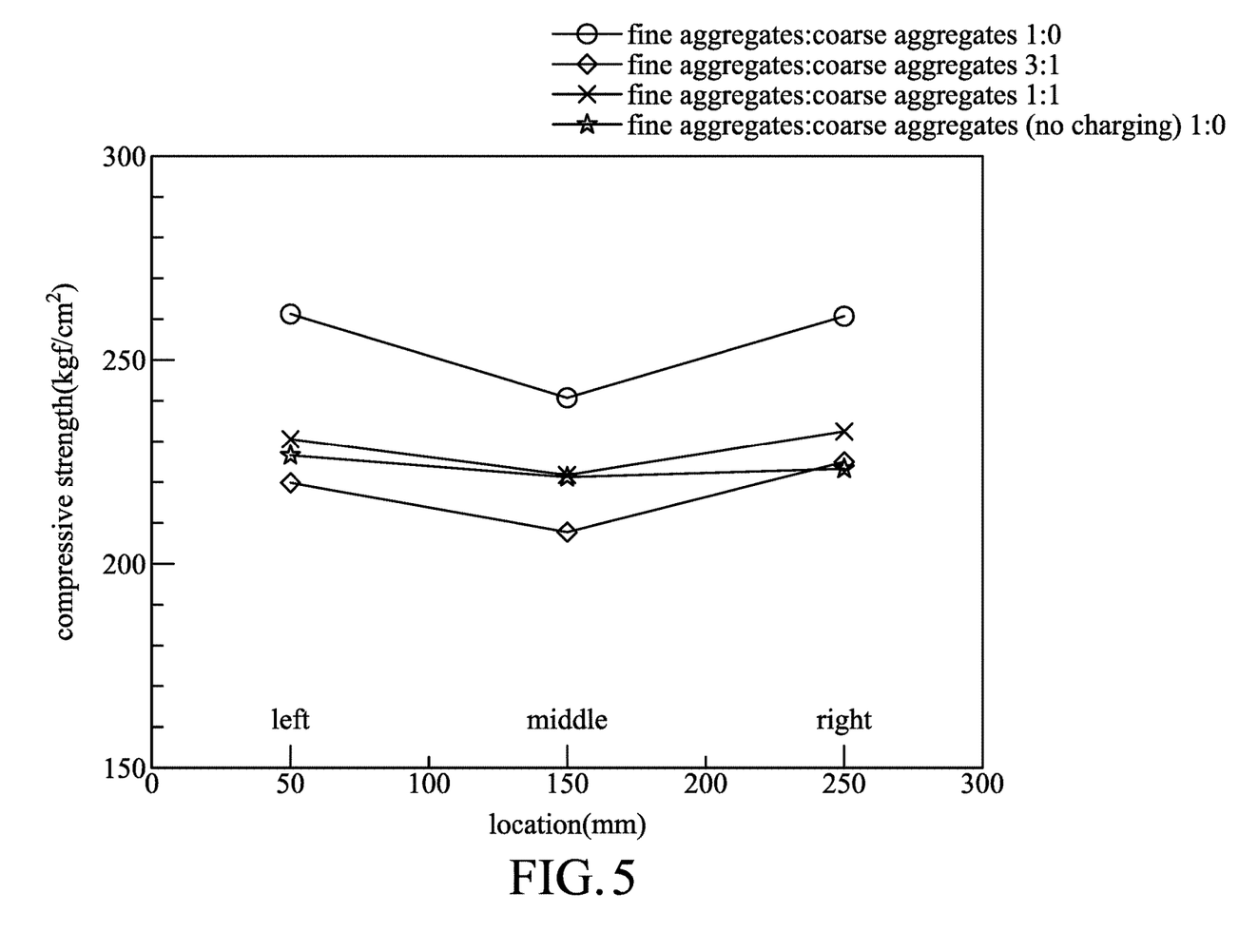
FIG. 5 is a plot of compressive strength versus location for specimens with different volume ratios of coarse and fine aggregates in accordance with an embodiment of the present invention.

FIG. 5 is a plot of the compressive strength versus location for specimens with different volume ratios of the coarse and fine aggregates. The cement paste into which coarse and fine aggregates at different volume ratios were added was used as the specimen, poured into the mold, and subjected to an electrical current of 0.05 A for 8 hours to form a cement-based cementitious material with a length of 300 mm. The compressive strength test shows that, whether the ratio of the fine aggregates and the coarse aggregate is 1:0 (fine aggregates only), 3:1, or 1:1 of the cement-based cementitious material after the electro-osmotic reaction, the functional grade is achieved. That is, the compressive strength at either of both ends is higher than that in the middle. It should be noted that all of the compressive strength is higher than 210 kgf/cm$^2$, which meets the minimum requirement for the structural concrete. As can be seen, the functionally graded cement-based cementitious material may be obtained by using either the cement mortar or the concrete.

Figure 6:
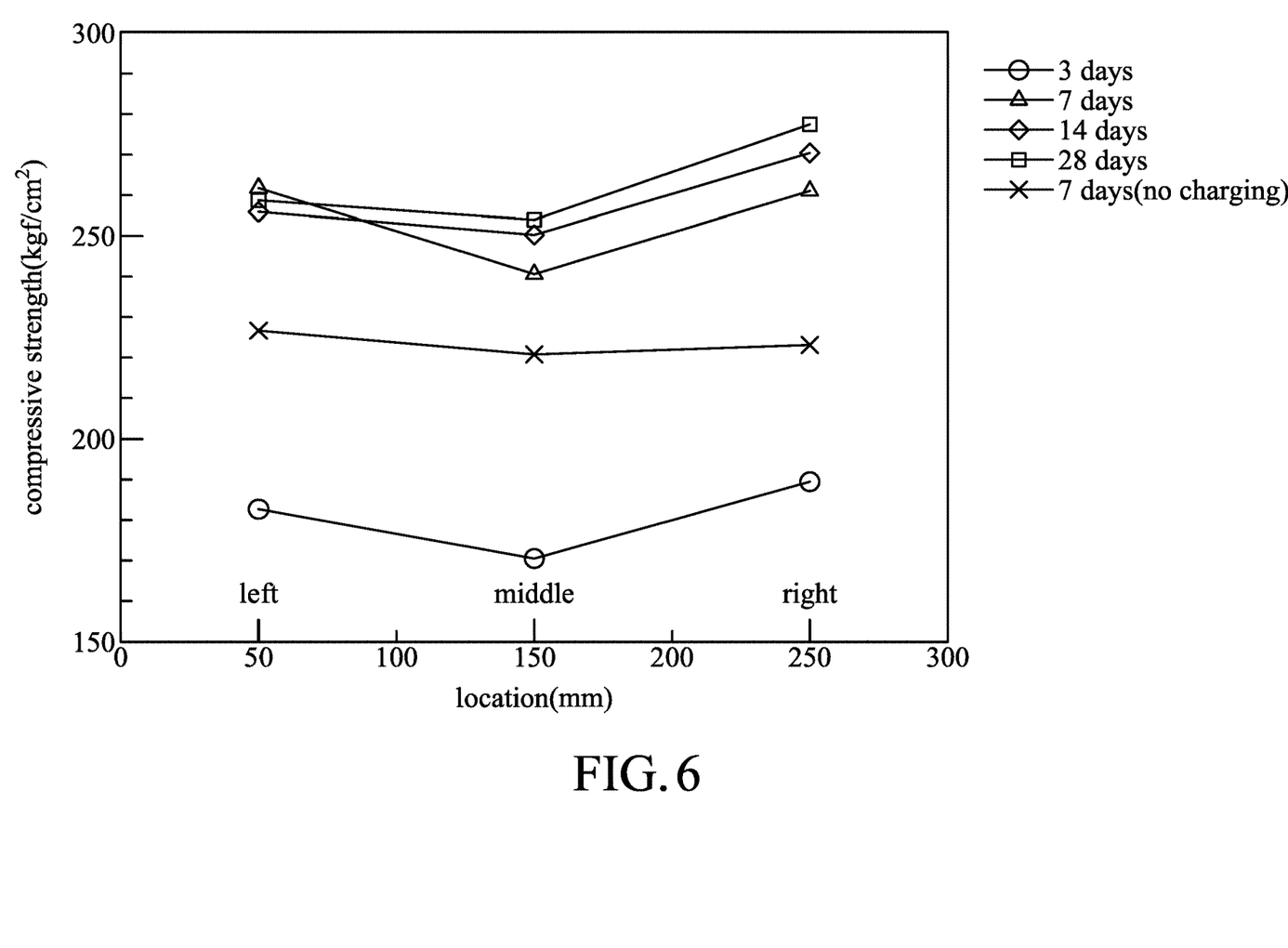
FIG. 6 is a plot of compressive strength versus location for specimens with different periods of curing in accordance with an embodiment of the present invention.

FIG. 6 is a plot of the compressive strength versus location for specimens with different periods of curing. The cement mortar was used as the specimen, poured into the mold, and subjected to an electrical current of 0.05 A for 8 hours to form a cement-based cementitious material with a length of 300 mm. The compressive strength test shows that, whether the cement-based cementitious material after the electro-osmotic reaction is cured for 3 days, 7 days, 14 days, or 28 days, the functional grade is achieved. That is, the compressive strength at either of both ends is higher than that in the middle. However, except for the compressive strength of the cement-based cement material cured for 3 days, those of the remaining are higher than 210 kgf/cm$^2$, which meets the minimum requirement for the structural concrete. As can be seen, the functionally graded cement-based cementitious material may be obtained regardless of the days of curing.

Table 1 is the result of the X-ray diffraction analysis. The cement mortar was used as the specimen, poured into the mold, subjected to an electrical current of 0.05 A for 8 hours, cured for 7 days to form a cement-based cementitious material with a length of 300 mm, and then subjected to the X-ray diffraction analysis. Since the cement used in this working example was Portland cement, its main components were dicalcium silicate ($C_2S$) and tricalcium silicate ($C_3S$), which can be used as a baseline to compare the amount of calcium hydroxide ($Ca(OH)_2$). It can be seen from Table 1 that the peak intensity ratio of the calcium hydroxide ($Ca(OH)_2$) to dicalcium silicate ($C_2S$) and tricalcium silicate ($C_3S$) of the cement-based cementitious material at either of both ends is higher than that in the middle. Since calcium hydroxide ($Ca(OH)_2$) is one of the main hydration products of the cement, it may be inferred that, when its quantity is larger, the cement is more hydrated and the strength is higher. Therefore, it can be inferred that the compressive strength at either of both ends is higher than that in the middle, as shown in Table 1.

TABLE 1

| Location | Compressive Strength (kgf/cm$^2$) | $\frac{Ca(OH)_2}{C_3S + C_2S}$ | Amorphous Ratio |
| --- | --- | --- | --- |
| left | 213.87 | 302.42% | 34% |
| middle | 168.69 | 298.34% | 34.9% |
| right | 207.59 | 304.55% | 32.4% |

Table 2 is the result of the X-ray diffraction analysis. The cement mortar was used as the specimen, poured into the mold, rested for 300 minutes, subjected to an electrical current of 0.05 A for 8 hours, cured for 7 days to form a cement-based cementitious material with a length of 300 mm, and then subjected to the X-ray diffraction analysis. Since the fine aggregates used in this working example was sand, its main component was silica ($SiO_2$), which can be used as a baseline to compare the amount of calcium hydroxide ($Ca(OH)_2$). It can be seen from Table 2 that the peak intensity ratio of the calcium hydroxide ($Ca(OH)_2$) to silica ($SiO_2$) of the cement-based cementitious material at either of both ends is higher than that in the middle. Since calcium hydroxide ($Ca(OH)_2$) is one of the main products of the hydration of cement, it may be inferred that when its quantity is larger, the cement is more hydrated and the strength is higher. Thus, it can be inferred that the compressive strength at either of both ends is higher than that in the middle, as shown in Table 2.

In addition, since the C—S—H is amorphous, the amorphous ratio can be calculated by the analysis software to estimate the amount of the C—S—H gel. Since the C—S—H gel is one of the compounds contributing to the compressive strength, it can be inferred that the higher compressive strength is related with the higher amorphous ratio and those strengths at both ends are higher than in the middle.

TABLE 2

| Location | Compressive Strength (kgf/cm$^2$) | $\frac{Ca(OH)_2}{SiO_2}$ | Amorphous Ratio |
| --- | --- | --- | --- |
| left | 241.13 | 9.36% | 21.7% |
| middle | 228.43 | 6.22% | 19.2% |
| right | 237.19 | 9.82% | 20.7% |

The present invention provides a method for forming functionally graded cement-based cementitious material by applying an electrical current to the cement paste.

The compressive strength of the cement-based cementitious material at either of both ends is higher than that in the middle, suggesting that the porosity at either of both ends is less than that in the middle. That is, the cement-based cementitious material has heat and acoustic insulation properties as well as sufficient strength to serve as structural load-bearing walls. Moreover, when compared with conventional structural concrete, the cement-based cementitious material of the present invention is more likely to achieve fire resistance.

Moreover, the present invention is applicable to any cement paste, cement mortar, concrete, or the like. Furthermore, the method of the invention only requires the application of a small electrical current for several hours. It can reduce the materials cost, facilitate mass production, and further reduce the equipment cost.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure and that they may make various changes, substitutions, and alterations herein without departing from the spirit and scope of the present disclosure.

What is claimed is:

1. A method for forming cement-based cementitious material, comprising:
pouring a cement paste into a mold, wherein a pair of electrodes is disposed in the mold, and the pair of electrodes is connected to an external power source;
applying an electrical current to the cement paste between the pair of electrodes to perform an electro-osmotic reaction, wherein the electrical current is applied for 2 to 14 hours and wherein the electrical current is between 0.01 A and 0.2 A; and
transferring the reacted cement paste into a water tank for curing, thereby obtaining a functionally graded cement-based cementitious material,
wherein a compressive strength in a middle of the functionally graded cement-based cementitious material is lower than that at both ends, and
wherein the functionally graded cement-based cementitious material has a ratio of calcium hydroxide (Ca(OH)$_2$) to silica (SiO$_2$) at both ends being higher than that in the middle.

2. The method as claimed in claim 1, wherein a water-to-cement ratio of the cement paste is between 0.6 and 0.8.

3. The method as claimed in claim 1, wherein the cement paste further comprises an aggregate.

4. The method as claimed in claim 3, wherein a size of the aggregate is between 150 μm and 75 mm.

5. The method as claimed in claim 1, wherein the application of the electrical current to the cement paste is performed immediately after pouring the cement paste into the mold.

6. The method as claimed in claim 1, wherein the application of the electrical current to the cement paste is performed after pouring the cement paste into the mold and resting for 1 minute or more.

7. The method as claimed in claim 1, wherein the pair of the electrodes is metal or metal alloy.

8. The method as claimed in claim 7, wherein the metal or metal alloy comprises titanium (Ti), or platinum (Pt).

9. The method as claimed in claim 1, wherein the curing is performed for 3 to 28 days.

10. The method as claimed in claim 1, wherein a length of the mold is between 250 and 550 mm.

11. The method as claimed in claim 1, wherein the cement paste further comprises a pozzolanic material.

12. The method as claimed in claim 1, wherein the pair of the electrodes is non-metal.

13. The method as claimed in claim 1, wherein the functionally graded cement-based cementitious material has the compressive strength in its entirety is higher than 210 kgf/cm$^2$.

14. The method as claimed in claim 1, wherein the functionally graded cement-based cementitious material has a length between 200 and 500 mm.

15. The method as claimed in claim 1, wherein the functionally graded cement-based cementitious material has a ratio of calcium hydroxide (Ca(OH)$_2$) to tricalcium silicate (3CaO.SiO$_2$) and dicalcium silicate (2CaO.SiO$_2$) at either of both ends being higher than that in the middle.

16. The method as claimed in claim 1, wherein the functionally graded cement-based cementitious material has an amorphous ratio at either of both ends being higher than that in the middle.

17. The method as claimed in claim 1, wherein the cement paste comprises a Portland cement.

18. The method as claimed in claim 1, wherein the electrical current is a direct electrical current.

* * * * *